US009148344B1

(12) United States Patent
Fernandez

(10) Patent No.: US 9,148,344 B1
(45) Date of Patent: Sep. 29, 2015

(54) LINKING A MESH NODE

(71) Applicant: PulseIQ LLC, Rockville, MD (US)

(72) Inventor: Emilio A. Fernandez, McLean, VA (US)

(73) Assignee: PulseIQ LLC., Rockville, MD (US)

( * ) Notice: Subject to any disclaimer, the term of this patent is extended or adjusted under 35 U.S.C. 154(b) by 0 days.

(21) Appl. No.: 14/189,340

(22) Filed: Feb. 25, 2014

Related U.S. Application Data

(60) Provisional application No. 61/771,307, filed on Mar. 1, 2013.

(51) Int. Cl.
*H04L 12/24* (2006.01)
(52) U.S. Cl.
CPC ........ *H04L 41/0869* (2013.01); *H04L 41/0806* (2013.01)
(58) Field of Classification Search
CPC ............ H04L 2209/76; H04L 2209/80; H04L 2463/061; H04L 63/062; H04L 63/0869; H04L 63/0884; H04L 63/0892; H04L 63/162; H04L 9/083; H04L 9/3236; H04W 12/04; H04W 12/08; H04W 84/18; H04W 84/20
See application file for complete search history.

(56) References Cited

U.S. PATENT DOCUMENTS

| | | | |
|---|---|---|---|
| 6,667,690 B2 | 12/2003 | Durej et al. | |
| 7,222,800 B2 | 5/2007 | Wruck | |
| 7,941,530 B2 | 5/2011 | Ha et al. | |
| 7,953,419 B2 | 5/2011 | Jost et al. | |
| 8,102,799 B2 | 1/2012 | Alexander et al. | |
| 8,122,249 B2 * | 2/2012 | Falk et al. | 713/168 |
| 8,893,968 B2 * | 11/2014 | Jonsson | 235/385 |
| 2003/0040279 A1 | 2/2003 | Ballweg | |
| 2005/0195757 A1 | 9/2005 | Kidder et al. | |
| 2009/0150356 A1 | 6/2009 | Walker | |

* cited by examiner

*Primary Examiner* — Ayaz Sheikh
*Assistant Examiner* — Debebe Asefa
(74) *Attorney, Agent, or Firm* — Whitham Curtis Christofferson & Cook, PC

(57) ABSTRACT

A method of linking a mesh node to a particular physical location is provided which achieves a very high degree of linking accuracy. Linking is authorized to take place only when stringent location verification criteria have been met and utilizes a Linking Application Program in a compatible portable device such as a smartphone. The Linking Application Program takes the installer through a step by step installation and linking process that ensures the maximum possible linking accuracy. The verification criteria requires that the pertinent data be gathered and then utilized to ascertain if indeed a mesh node being installed is in the right location.

24 Claims, 9 Drawing Sheets

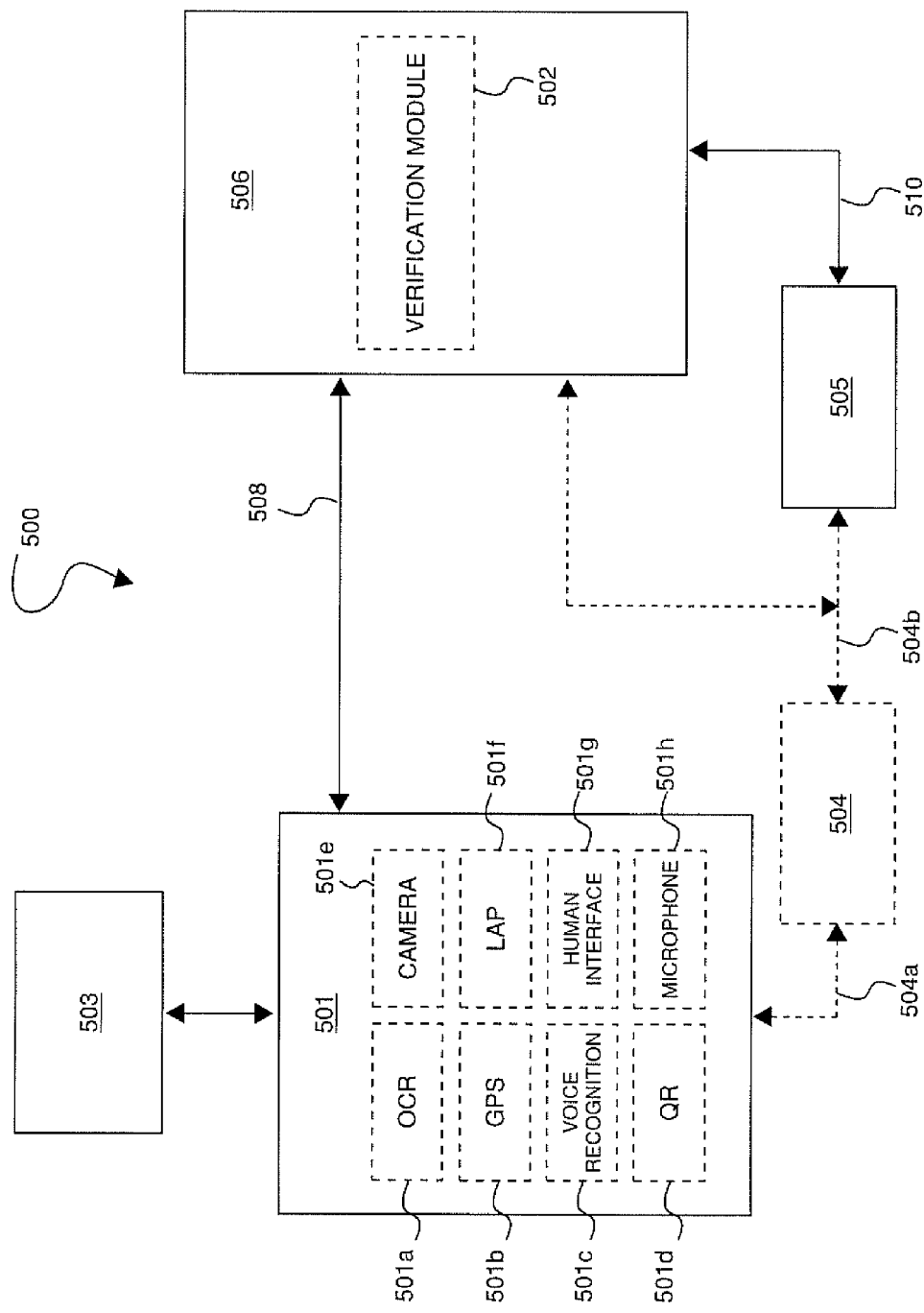

LINKING A MESH NODE

CROSS-REFERENCE TO RELATED APPLICATIONS

This application claims the priority of U.S. Provisional Patent Application No. 61/771,307, filed Mar. 1, 2013, which is hereby incorporated by reference in its entirety.

DESCRIPTION

1. Field of the Invention

The invention generally relates to mesh networks and, more particularly, to linking mesh nodes and locations within mesh networks providing building automation.

2. Background

Low power radio mesh networks employing protocols such as Zigbee and Z-Wave have gained popularity over the last few years. There are many uses for these networks, but they are frequently used in the area of home automation to control lights, thermostats, and other devices in a home environment. These networks normally have multiple nodes all linked to a local central processor called a coordinator. A critical requirement is to uniquely identify each node within the network under a given coordinator. Nodes are produced with a permanent number referred to as the IEEE, media access control (MAC) address, or Serial Number. It is of great importance that an individual node associated with a given physical location and function is uniquely and accurately linked to the coordinator, ensuring that a command sent by the coordinator intended for a particular node is applied to the correct device and executed at the correct location. Furthermore, when information is received from a node it is important to know the correct origin. In a typical home automation mesh network, the coordinator is also connected to a computer locally via a local area network (LAN) or remotely through an internet protocol (IP) connection.

In order to establish and maintain a unique connection between a coordinator and each node, a procedure must be established that allows unique identification of a given node relative other nodes. This process is commonly known as "linking". There are various linking methods used by different providers of mesh networks. One such a method is employed by Control4, a well-established company primarily in the home automation field. According to the Control4 method, a Control4 coordinator is preset to receive a linking command and associated address from a node physically located within the mesh network but which is yet to be identified according to the network's communication protocol. The coordinator is temporarily armed to receive an identifying transmission, during which time a user physically presses a button in a particular fashion or sequence, such as pressing four times in succession, at the particular node that is to be linked, such as a Control4 light switch. The node and coordinator are thereafter linked.

SUMMARY

According to the invention, novel and highly accurate methods of mesh network linking are provided. Generally, the invention is pertinent to any application involving the linking of a mesh node to a particular location, for example a particular apartment in a building. One such application is in a mesh network designed to cover a building such as a residential high-rise apartments or a campus comprising several buildings. Garden type apartments are a well known example. In this application, one mesh node is placed in each apartment to monitor and/or control parameters such as temperature and also to display useful information to the occupant. In some cases, the mesh node is also configured to request and receive acknowledgment from an occupant.

A typical installation has one to three nodes per apartment and one coordinator per building or campus. Each building or campus is connected to a remote central office computer (COC). In very large apartment complexes more than one coordinator may exist, each with its own mesh network. A single COC may manage a large number of buildings in diverse locations anywhere in the world. Cost and operating constraints dictate that installation of mesh nodes be accomplished rapidly and accurately. The correct linking of a particular location (e.g. a particular apartment) to its corresponding mesh node is critical. Finding and correcting any linking errors would be difficult and very costly not only in terms of monetary expenses but also in terms of customer acceptance and satisfaction. Thus the accuracy goal for this operation needs to be very high. The method hereby described aims to attain a linking error rate not to exceed 1 part per million (PPM).

To achieve improved accuracy of linking as compared to the systems and methods known in the art, the invention generally involves the collection of input data pertinent to a correct linking, and verification of such data using certain verification criteria. The linking process is allowed or authorized to take place only when all required verification criteria (i.e. Location Verification Criteria) have been met. A specially developed procedure referred to as a Linking Application Program (LAP) guides an installer through a step by step installation and linking process. All the required data is obtained and then used to ascertain if indeed the mesh node being installed is in the right location.

Input data may include, for example, a complete installation address, GPS coordinates, one or more photographs, and mesh node identification. Input data is received, captured, collected, or otherwise obtained by a portable/mobile electronic device used by an installer. An exemplary mobile electronic device is a smartphone or similar device, such as an iPhone (trademark of Apple Inc.) based device or Android (trademark of Google Inc.) based device, equipped with a specific application program, i.e. a Linking Application Program (LAP), configured according the teachings herein and stored in non-volatile memory of the mobile electronic device.

After the installer gets to the location where the mesh node is going to be installed (i.e. the installation location), the installer starts the Linking Application Program (LAP) on the mobile electronic device. The LAP prompts the installer to enter the complete address of the location where the mesh node is to be installed and uses Optical Character Recognition (OCR) to decode a photograph or multiple photographs (e.g. a video) taken of the house number or apartment number sign/placard so as to have redundant data on the location. Global positioning system (GPS) coordinate data is also taken and stored. Generally, collection of input data is controlled or managed by the LAP. The LAP prompts the installer to enter a mesh node's unique identification (or ID) and to have a code reading module, e.g. a QR software module, read a code, e.g. a Quick Response (QR) code label, printed on a label of the mesh node to be installed. All of this data is saved by the LAP to a non-volatile storage medium/media and sent to a central office computer (COC), or, more generally, a verification module.

If the installer desires authority to install the particular mesh node in the particular location, request for such authorization is made by the LAP of the COC (or, more generally, the verification module). The verification module performs a verification process. The verification process can include but is not limited to:

1. Verifying that the mesh node ID is within the range assigned to that installer for that particular day and that that mesh node ID has not been used previously in any other installation.
2. Verifying the location by comparing all the received and required input data, such as: apartment or house number as read by the OCR, location address manually entered by the installer, GPS coordinates, time and date of installation, and reference data from an installation database to ensure that the location has not been linked previously to another mesh node and/or that the linking and installation have been scheduled.

If all required verification criteria are met, then the COC, or more generally the verification module, authorizes the installer to proceed with the installation. If the verification criteria are not met, then the verification module may request any additional or corrected data which is necessary. If this is done satisfactorily then the installation is authorized to proceed. If the verification module cannot authorize the installation or if the installer cannot get access to an installation location in question, then the installation is denied or aborted and any future installation at that location would have to start again at the beginning of the linking process.

DESCRIPTION OF THE DRAWINGS

FIG. 5 shows a mesh network system without a central office computer (COC); and

DETAILED DESCRIPTION

It is noted that multiple figures described herein contain analogous structures which perform substantially the same functionality and operations. For ease of reference, elements within each figure are identified with three digits, where the first digit matches the number of the figure. To assist in recognizing analogous structures, the remaining digits correspond for analogous structures of separate figures. As an example, FIG. 2 contains verification module 202 and FIG. 3 contains verification module 302. These are analogous structures, where verification process steps described in relation to module 202 are generally likewise applicable to module 302. Any differences between analogous elements will be apparent to those of skill in the art in view of explanations provided herein and the figures themselves. Furthermore, descriptions provided in the context of one figure or exemplary embodiment are not intended to be limiting to just that figure or embodiment, rather they are illustrative teachings which may be implemented in other embodiments of the invention.

"Mesh node" and "node" are used interchangeably herein. The meaning of mesh node will be clear to one of skill in the art but may furthermore include, without limitation, meters, in-home displays, in-home thermostats, load control devices, or any combination of such devices. It is also noted that "data" as used herein obeys the proper grammatical rule of plurality, namely that "data" is a plural term meaning at least one datum together with at least one other datum.

Figure 1A:
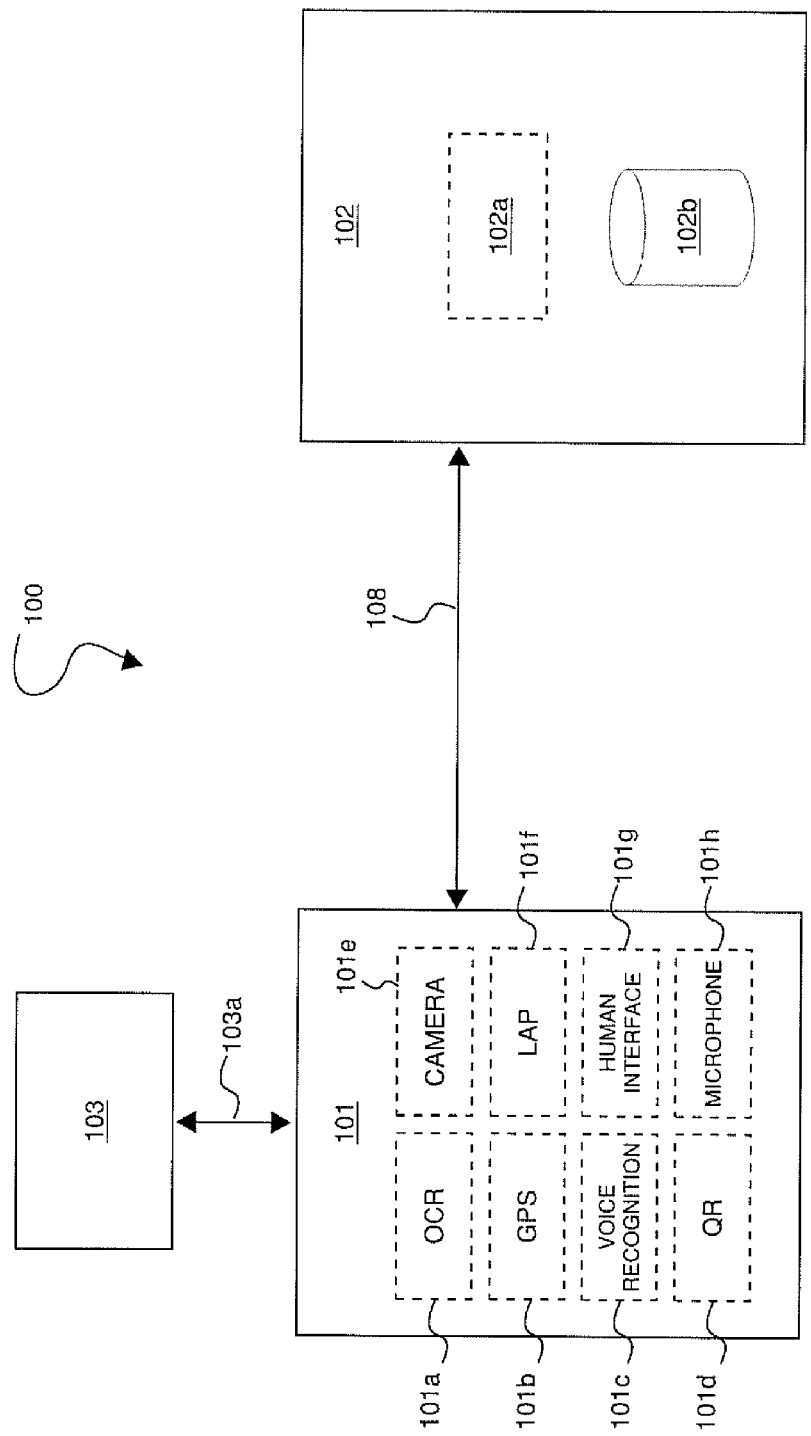
FIG. 1A shows a mesh network linking system having a mobile electronic device and a verification module.

Referring now to the drawings, and particularly to FIG. 1A, a linking system 100 generally requires a portable/mobile electronic device 101 and a verification module 102 (i.e. a Location Verification Criteria Software or Software Module). The mobile electronic device 101 may be a smartphone, tablet, or similar device, or it may be a specially designed device specific for mesh network linking. (In the case of a specially designed device, this may be in some ways analogous to package scanning and tracking mobile electronic devices specially designed for use by delivery services such as UPS, FedEx, and the United States Postal Service (USPS).) The verification module 102 includes at least one or more processors 102a and one or more storage media 102b. Other necessary hardware components may be included and will be evident to those of skill in the art.

Mobile electronic device 101 serves as means for an installer 103 to enter input data relevant to the linking process. Transfer of information from the installer 103 to the mobile electronic device 101 is represented by arrow 103a. Although an installer 103 may employ such rudimentary tools as pen and paper in connection with the mobile electronic device, the data ultimately must be captured in an electronic form to allow semi- or fully-automated verification and authorization of mesh node linking. In order to capture or collect input data, the mobile electronic device 101 may be equipped with one or more of a number of modules comprising hardware, software, firmware, or some combination thereof. Generally, the mobile electronic device 101 is equipped with and may include but is not limited to the following software/hardware packages or modules:

- Optical Character Recognition (OCR) software module 101a,
- GPS module 101b,
- Voice Recognition software module 101c,
- QR Bar Code Reader (QR) software module 101d,
- a camera 101e,
- Linking Application Program (LAP) 101f,
- one or more human interfaces 101g, and
- a microphone 101h.

Required input data can include but is not limited to:
- a complete address of the installation location in question,
- GPS coordinates of that location, one or more photographs of the specific location address as physically marked (e.g. an apartment number posted on a wall next to the front door of the apartment or on the apartment mailbox),
- the unique identification (e.g. ID number) of the mesh node being installed such as read by the installer in a voice recording or as read using a Quick Response code (QR) label reader (generally, each mesh node has a printed label identifying a unique ID as either or both a QR code and letters/numerals),
- installer identification (e.g. the name or codename of the installer), and
- the time and date of the installation.

Input data received and collected by the mobile electronic device 101 is passed to the verification module 102 as shown by connection 108.

Figure 1B:
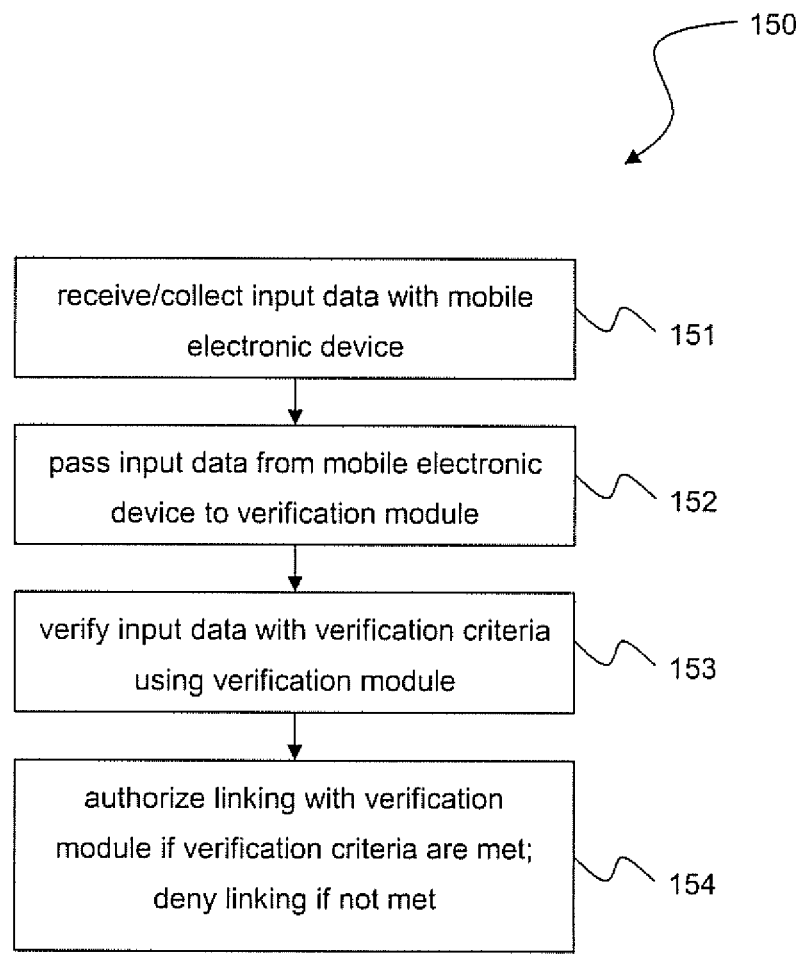
FIG. 1B shows a method of linking at least one mesh node in a mesh network to a particular location.

FIG. 1B illustrates a method 150 of linking at least one mesh node in a mesh network by way of a mobile electronic device 101 and verification module 102. Linking method 150 may be generally summarized according to the following steps:

At step 151, receiving with the mobile electronic device 101 input data such as an installation address, GPS coordinates of the mobile electronic device 101 as determined by the device's GPS module 101*b*, one or more photographs as captured by the device's camera 101*e*, and mesh node identification. Data such as installation address and mesh node identification may be entered by any suitable user/human interface 101*g* of the device, including, for example, a display screen or a microphone 101*h* should the information be recorded as an audio recording which is subsequently processed by voice recognition module 101*c*.

At step 152, passing the input data from the mobile electronic device to the verification module.

At step 153, verifying the input data with verification criteria using verification module 102. The necessary data comparison may be performed with the verification module's processor 102*a*. The verification criteria may include, but are not limited to, one or more of the following:

a first agreement/criterion, where the installation address, the GPS coordinates, an address in the photograph, and a reference installation address are in agreement. In some embodiments, an agreement may be required between a subset of such data elements, such as an agreement between the installation address and a reference installation address. An address in the one or more photographs may be determined using optical character recognition (OCR) module 101*a*.

a second agreement/criterion, where the mesh node ID and a reference mesh node ID are in agreement. Reference data such as but not limited to a reference mesh node ID may be stored in the storage medium 102*b* of the verification module 102. A mesh node identification may be pre-programmed into a non-volatile memory of a node at the factory when the device is produced, in which case the mesh node identification may report the identification to the mobile electronic device via a display. The mesh node may also transmit the identification to a coordinator and/or a mobile electronic device over a network.

At step 154, authorizing the linking with the verification module if the verification criteria are met in the verifying step or else denying the linking if the verification criteria is not met in the verifying step.

Figure 2:
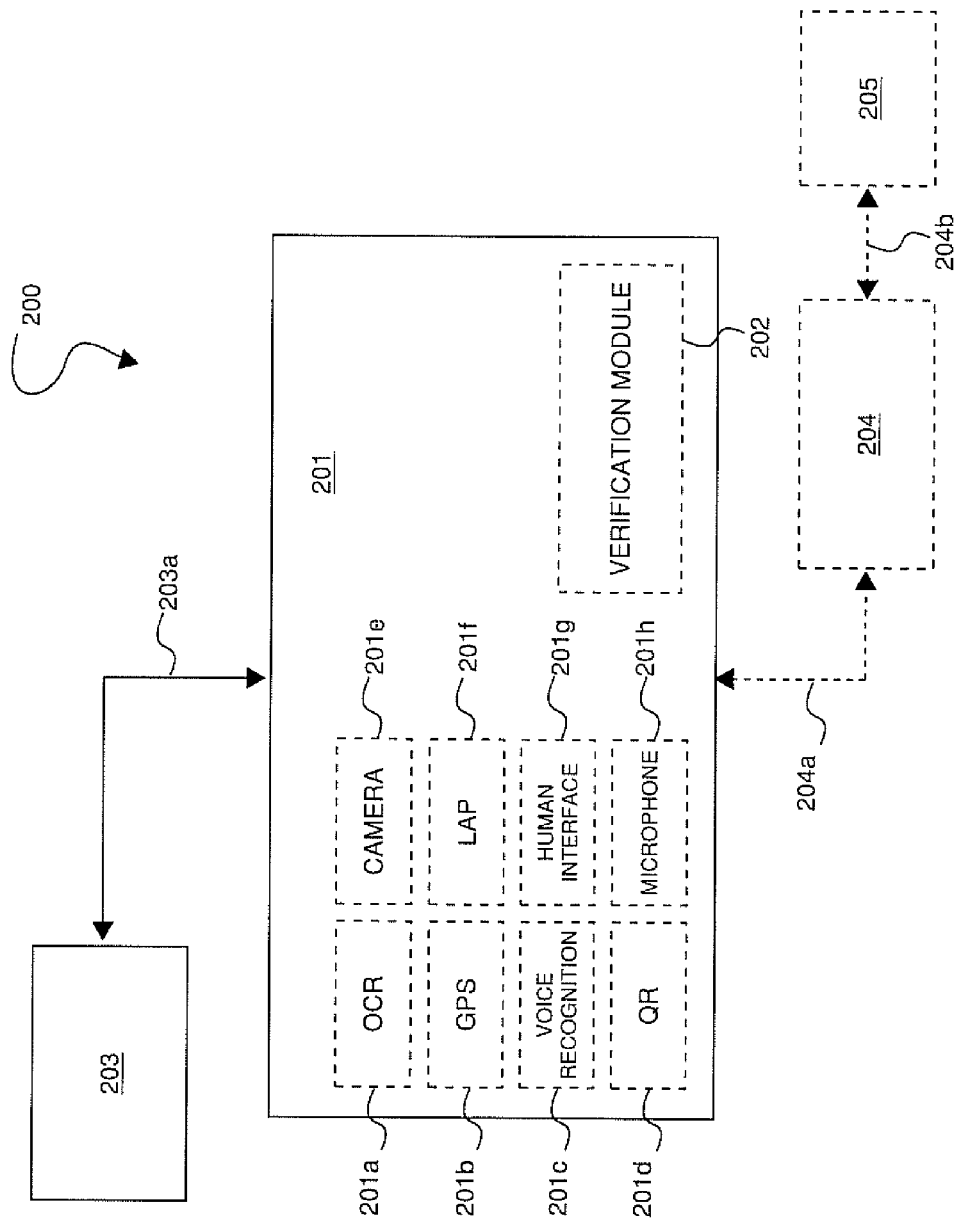
FIG. 2 shows a mesh network linking system having a mobile electronic device which comprises a verification module.

Referring now to FIG. 2, a linking system 200 requires at a minimum a mobile electronic device 201 (e.g. smartphone) and a verification module 202. In this case, the verification module 202 (including what can be called Location Verification Criteria Software) resides in the mobile electronic device 201 itself. The verification module 202 may have a dedicated processor and storage medium or, as is generally preferable for purposes of space and cost, one or more shared processors and storage media usable by the verification module 202 as well as other systems and components of the mobile electronic device 201. In order to perform verification of input data, reference data such as a reference installation address and a reference node identification must first be downloaded and stored on the device 201. This information may be downloaded from an existing database of mesh nodes and locations at some central location or data warehouse (not shown).

In some embodiments, an interfacing module 204, or so-called Smartphone to Mesh Network Module, may be included. Such an interfacing module 204 provides communication between the mobile electronic device 201 and one or more mesh nodes 205 as indicated by connections 204*a* and 204*b*. If provided, interfacing module 204 allows the mobile electronic device 201 to communicate with any mesh node within radio range.

Input data collected by the device 201 in coordination with the installer 203 (such coordination being shown by arrow 203*a*) as well as results of verification performed by the verification module 202 may be stored, at least temporarily, on a non-volatile storage medium of the device 201 (see, e.g., storage medium 102*b* of mobile electronic device 102 in FIG. 1). The stored information may be immediately or at some later time downloaded from the device 201 to a central office computer or coordinator (not shown in FIG. 2). The necessary data storage on the device 201 of reference data and/or results data is advantageous in that the device 201 need not be in communication with any external network or central office computer or coordinator at the time of execution of a linking process. However, this comes with the drawback that loss or damage of the device 201 may result in loss or damage of the linking information.

Figure 3:
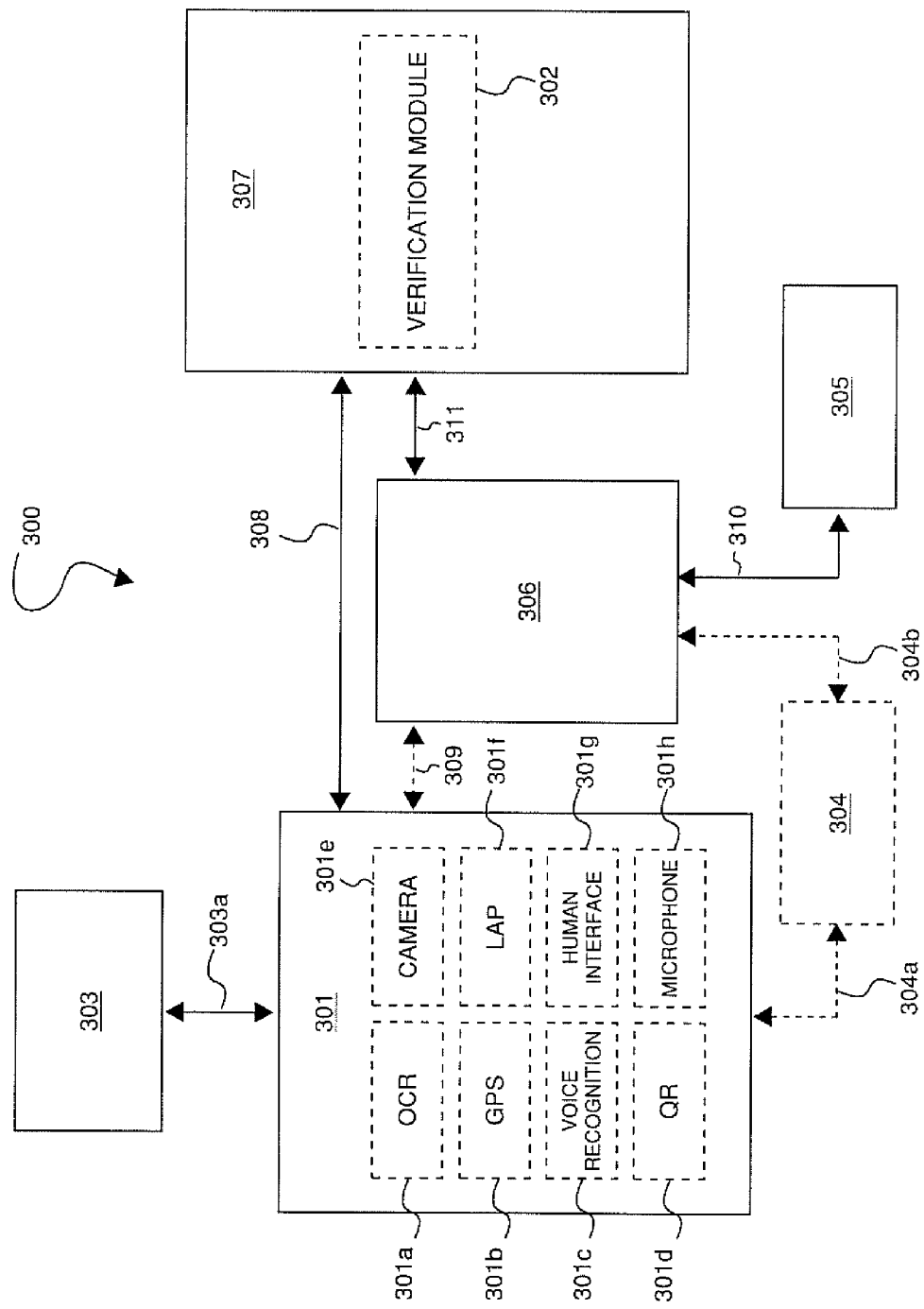
FIG. 3 shows a mesh network linking system having a mobile electronic device, a central office computer (COC) comprising a verification module, a coordinator, one or more nodes, and a possible interface module for interfacing the mobile electronic device and the coordinator.

FIG. 3 shows a system 300 which includes a mobile electronic device, which here for illustration purposes is smartphone 301, at least one coordinator 306, a central office computer (COC) 307, and one or more nodes 305. In contrast to the linking system 200 of FIG. 2, COC 307 includes verification module 302. A connection 308 is provided between smartphone 301 and COC 307 which allows transmitting input data from the smartphone 301 to the COC 307. A connection 308 may be implemented in a variety of forms, including but not limited to a wired or wireless (Wi-Fi) internet (IP) connection and a cellular network. In any case, the smartphone 301 and COC 307 are in two different locations—that is to say the smartphone is at a first location which is the installation location and the COC is at a second location remote from the first location—and those of skill in the art will recognize that many standard data transmission options may be used for connection 308 provided they are sufficiently secure and robust. For accurate linking, it is desirable that connection 308 be highly resistant to corruption, loss, or malicious manipulation of any data transmitted by connection 308. In some embodiments, connection 308 may comprise voice communication/transmission between the installer 203 at the installation location and a human operator at the second location. In such a system, at least a portion of the requisite input data may be passed from the installer to the human operator for entry into the verification module. Voice transmission may be in real time, such as over a phone call, or voice recordings may be used. In this case, a step of receiving input data may include recording one or more of the input data elements with the smartphone 301 (e.g. using a microphone 301*h* thereof) as an audio recording. Examples of input data which may be recorded as audio recordings include installation address, a mesh node identification, and an installer identification. The installer 303 would save the recording in which he entered the pertinent data, and the saved recording may then be transmitted by connection 308. This data could be used for the critical verification steps performed by verification module 302, or, alternatively, as further verification of the linking accuracy. That is, voice recordings could be taken to provide supplemental input data which is generally redundant to (and thus usable as corroboration of) other input data.

Verification module 302, although residing in COC 307, performs substantially the same verification processes as verification module 202 shown in FIG. 2 and already described above in relation thereto. This includes but is not limited to verifying: that a node serial number is in the correct format, in the range of numbers assigned to an installer, and never used before; that the address of the physical location is listed in the work assigned to the installer that given work day; that the physical location is unique and has not been used before for another installation; and that the GPS data is in agreement with the physical location.

The Smartphone 301 can be, for example, an iPhone, an Android based device, an iPad, or any portable device that can accommodate the preferred hardware and software necessary to implement the high accuracy linking method described herein. Such hardware and software includes but is not limited to: an optical character recognition (OCR) software module 301a, GPS module 301b, Voice Recognition software module 301c, QR software module 301d, camera 301e; and the Linking Application Program (LAP) 301f. While it is generally desirable for maximum accuracy to have all the above mentioned hardware and software components, those skilled in the art will recognize that different embodiments may have a subset of these exemplary elements and/or additional hardware/software modules. An installer 303 communicates and interacts with the smartphone 301 or similar device through one or more of the smartphone's interfaces, represented by arrow 303a. These can include, for example, the device's human interface which could be a keyboard, number pad, touch screen display 301g, microphone 301h, or other device configured for I/O functionality. Other suitable satisfactory human interfaces will occur to those in the art. Similar to interface module 204 of system 200 (see FIG. 2), an interface module 304 may also be provided for communication between smartphone 301 and coordinator 306 and indicated by arrows 304a and 304b. A connection 309 such as an Internet or Wi-Fi connection may also or alternatively be provided. The interface module 304 can be a specially designed physical device that attaches to one of the ports of the smartphone 301, or which communicates with the smartphone 301 wirelessly such as with a Bluetooth type of link. In any case, the interface module 304 may then communicate with the coordinator 306 through the mesh network.

A coordinator 306 typically communicates with all the nodes 305 in a building or campus as shown by connection 310, receiving data from the nodes 305, sending data and instructions to the nodes, and also notifying and sending to any node any updates of the node's software. Data and instructions sent between a coordinator 306 and one or more nodes 305 may include but is not limited to data which may be displayed on a digital display of the node, in the case the node in fact has a display. In very large apartment complexes or campuses more than one coordinator 306 each with its own mesh network may exist as the number of nodes per coordinator is generally limited. Whether there is just one coordinator 306 or a plurality of coordinators 306, they are in turn connected via connection 311 (e.g. an Internet connection) to a remote central office computer (COC) 307. The COC 307 can be configured to manage a large number of buildings or campuses in diverse locations anywhere in the world. While this description generally refers to COC 307 in the singular, those skilled in the art will understand that COC 307 may constitute or comprise many computers in one location or several locations working together to perform the operations and provide the function of COC 307. A COC 307 may also be implemented using cloud computing.

In linking system 300, the COC 307 contains the verification module 302 and has ultimate control of the linking process. The installer 303 cannot perform the linking operation through to successful completion unless the COC 307 authorizes it. Authorization/denial may take a variety of forms. As just one example, the verification module could generate a random number or code recognizable to the LAP as an authorization key without which authorization cannot proceed. An installer 303 would be required to enter this number/code for authorization to take effect and for the installation to be valid. Simpler methods of authorization such as the installer responding to the COC 307 with a known number or initials are of course possible.

The COC 307 also receives and permanently stores the linking information which generally includes a table of node IDs and their respective physical locations. This information is crucial and is preferably stored in more than one location so as to prevent or at least minimize the risk of any loss of data. The COC 307 generally communicates with the smartphone 301 via connection 308 (e.g. the internet) but may also do so via a coordinator 306. For example, this would be done if for some reason connection 308 were unavailable.

Figure 4A:
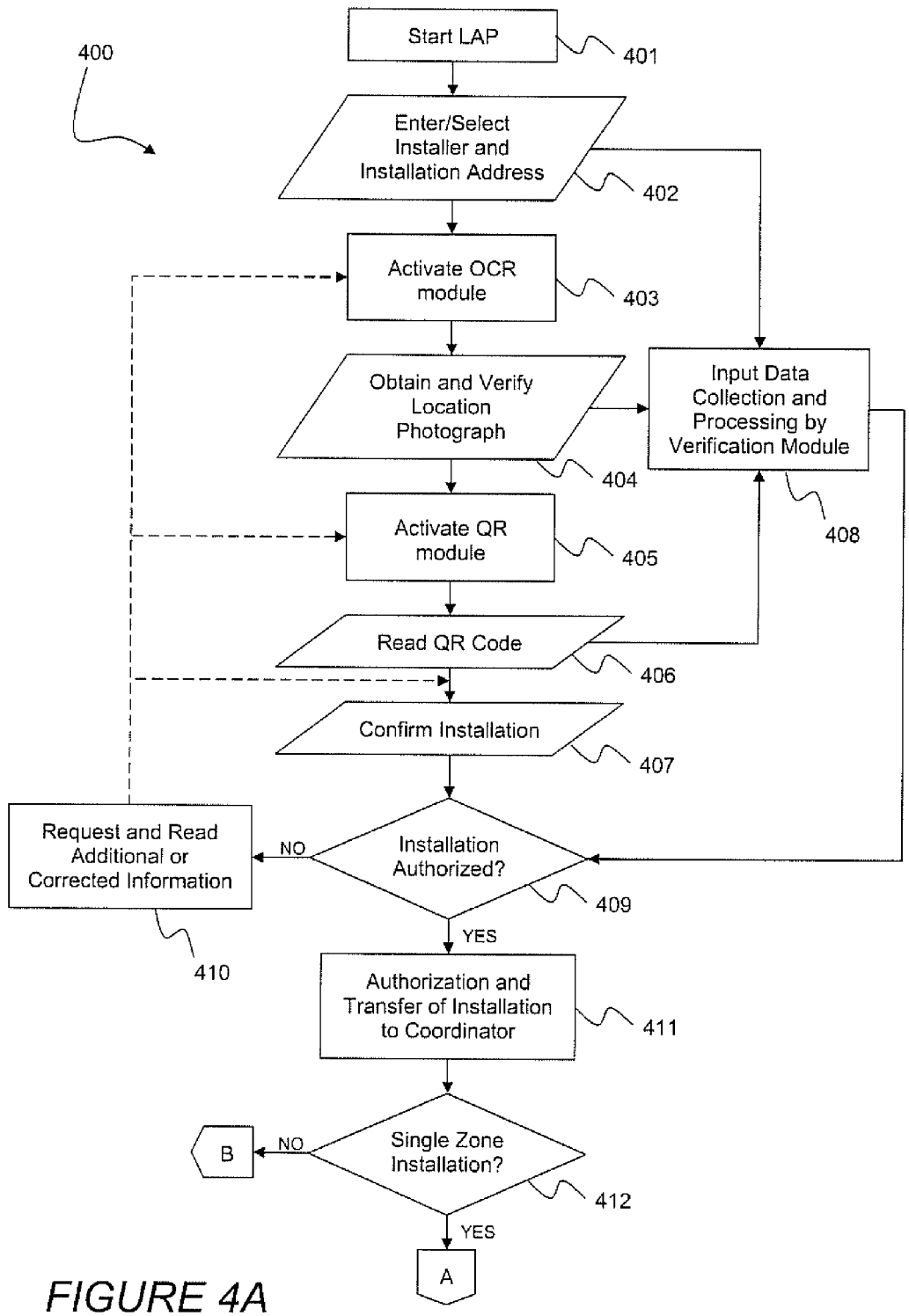
FIGS. 4A-4C show a logic sequence according to the invention.
Figure 4B:
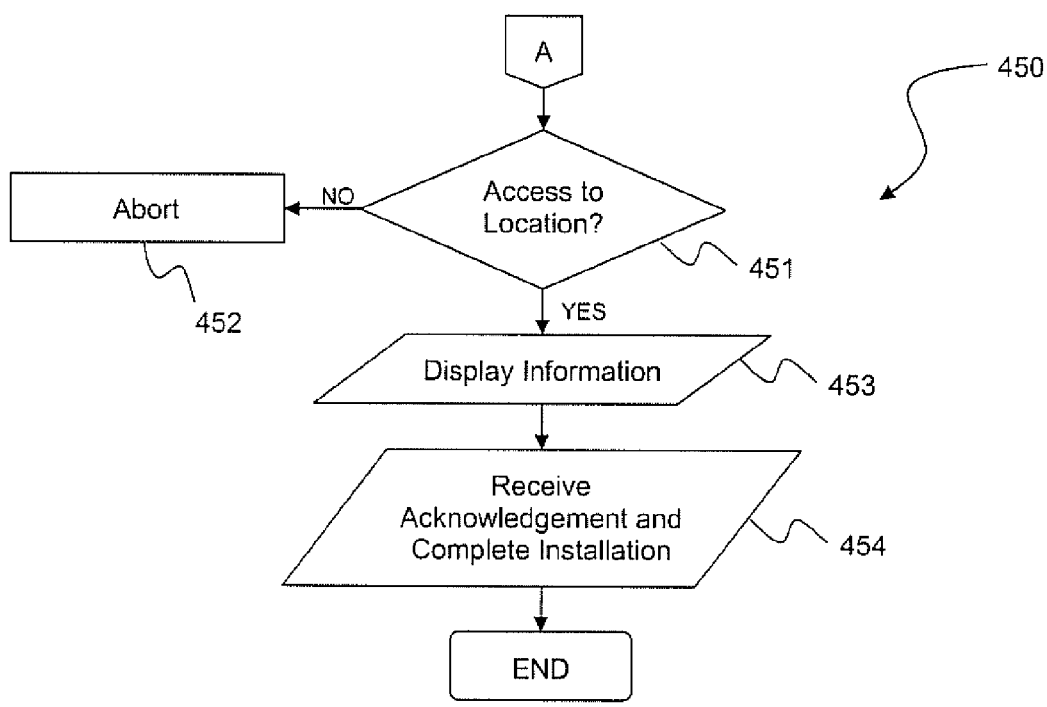
Figure 4C:
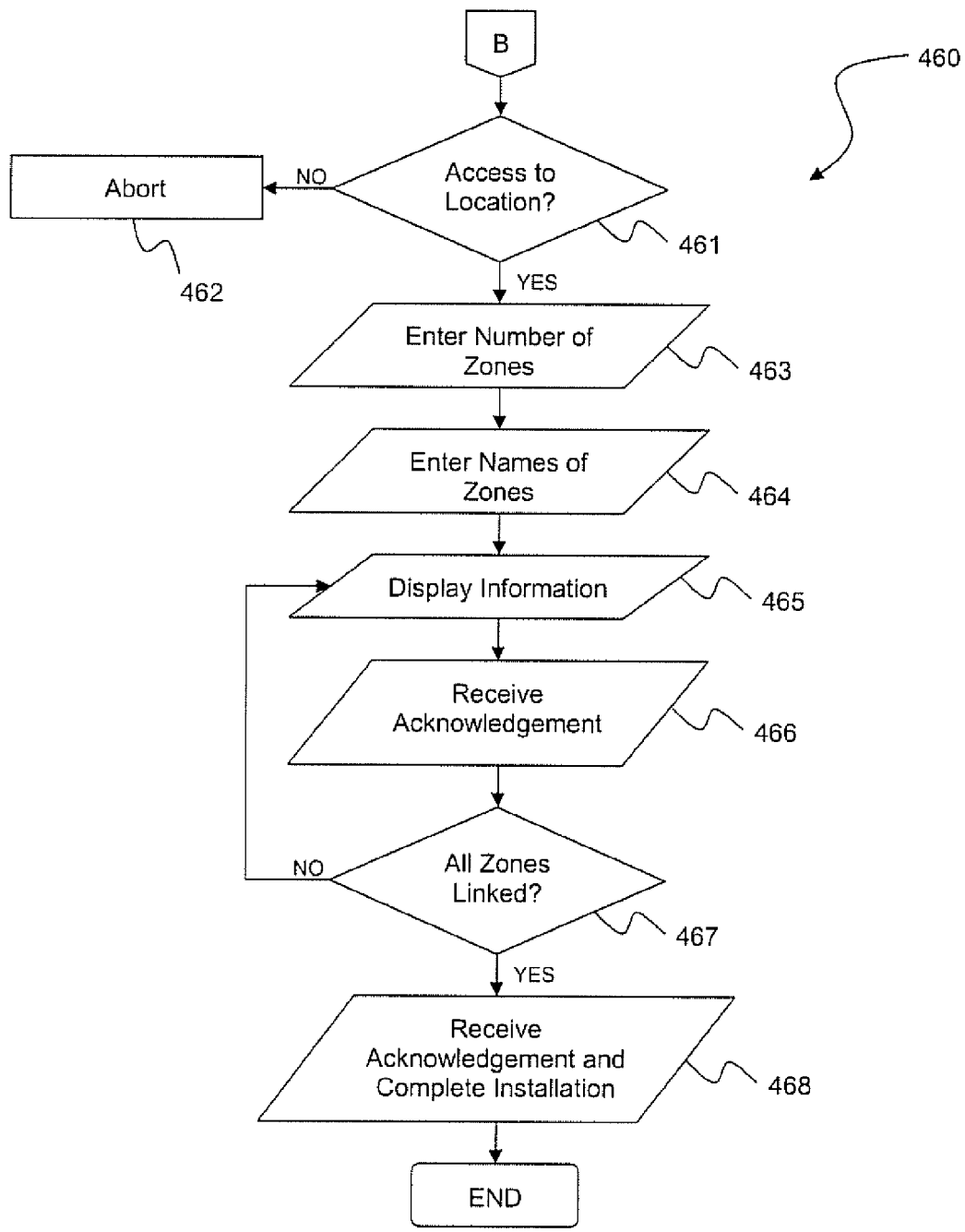

FIGS. 4A, 4B, and 4C illustrate an exemplary linking logic process/sequence 400 according to an embodiment of the invention. It is noted that the process 400 and routines 450 and 460 shown are provided for illustrative purposes. Those skilled in the art will recognize that other logic sequences similar but not wholly identical to what is shown and described may alternatively be used in accordance with the teachings herein. Note that language of "LAP Output:" as used gives examples of messages which may be provided, but alternatives and variations of these messages may be used in accordance with the invention. Process 400 may be generally described thusly:

1. Start LAP 301f at step 401.
2. LAP Output: "Please enter installer's name (or check previously entered name) and enter the complete address of the location where the installation is going to take place." The Installer complies with the request and the LAP stores this information on the smartphone at step 402.
3. The LAP activates the OCR software module at step 403 and asks the installer to point the camera to the location number until the OCR has properly decoded the location number. LAP Output: "Please take a photo of the location number." Installer complies.
4. Installer and the LAP verify that the operation has been performed successfully and that what appears to be valid data has been obtained at step 404.
5. LAP Output: "Retrieve the Mesh Node hardware to be installed and uncover the square bar code label attached to the Mesh Node hardware." The LAP activates the QR software module at step 405 and instructs the installer to point the camera to the Mesh Node bar code label.
6. The LAP confirms that the mesh node ID has been read at step 406 and informs the installer of the successful completion of this step.
7. Confirmation to proceed with the installation is made at step 407. LAP Output: "Does installer [John Doe] request permission to install Mesh Node ID number [XXXX] to location [YYYY]? If yes, please verify the Node ID and location information and acknowledge that a) the information is correct and that b) you want to proceed with the installation." The installer acknowledges both requests.

8. Throughout this process the COC has been receiving and storing all the installation data gathered by the smartphone via the internet, Wi-Fi, and/or any other available means as indicated by step 408. Once all necessary input data has been transmitted to and received by the COC, the LAP waits for the COC to respond to the LAP's request to proceed with the installation.
9. The verification module, which in this example is part of the COC, performs a rigorous check on all the input data/information received, and if the information received is sufficient, correct, and meets the verification criteria then the COC responds to the LAP authorizing it to proceed at step 409. If the information is not sufficient or the verification criteria is not met, then the COC will deny authorization to complete linking and inform the installer accordingly via the smartphone. Authorization or denial to proceed with the linking process takes effect at step 409.
10. At step 410, the COC requests any additional information that might be needed or ask the installer to correct any errors that might have been found. If the requested action is not successfully accomplished the COC informs the installer via the smartphone that the installation will not be authorized (i.e. installation is denied).
11. If the installation is authorized by the COC, then the COC communicates this to the LAP and to the installer via the smartphone. The COC also communicates with the local coordinator that services that particular node being installed and empowers/authorizes it to allow and finish the installation at step 411. The COC gives the coordinator the necessary data to finish the installation. At this point the coordinator has all the necessary information to complete the installation and it has been authorized by the COC, and for the remainder of the sequence the coordinator is generally in charge of the installation. (Note that in embodiments not having a coordinator, installation may be completely by the COC. Alternatively, in embodiments not having a COC or coordinator available during installation, the smartphone may conduct the full installation as controlled by the LAP and verification module. The latter case applies to system 200 in FIG. 2.)
12. A determination is made at step 412 as to whether the installation is a single zone installation (as opposed to a multi-zone installation). A zone is a subdivision or a particular section of an apartment or house. For example, in a big apartment there could be three "zones", these being the main living area or living room and two bedrooms such as the master bedroom and a guest bedroom. In the case of multiple zones for an address, each zone is associated with a different node but with the same address. LAP Output: "I have authorization for you to proceed with the installation. Is the installation a single zone installation?" The installer submits an answer. If "yes" the process continues according to the steps of routine 450 shown in FIG. 4B. If "no" the process continues according to the steps of routine 460 shown in FIG. 4C.

As shown in FIG. 4B, process 400 may continue with routine 450 as follows:
1. At step 451, determination is made as to whether the installer has the necessary access to the physical installation location. LAP Output: "Please acknowledge that you have access to the apartment and that you will proceed to install the mesh node hardware." If the installer acknowledges having access to the location, the linking proceeds. LAP Output: "Please proceed with the installation." At this point the physical installation is made. Generally, this involves removing the old node (if there is an old node being replaced) and physically installing the new node.
2. If the installer cannot get access to the installation location, then the installation is aborted at step 452 and the sequence has to be started again from the beginning as in a new installation.
3. LAP Output: "Once the installation is completed and the Unit has power, verify that the information displayed on the screen is correct" Here, the display screen of reference may be a screen on the mesh node (i.e. "Unit") if it has a screen and/or a human interface of the smartphone. The summary details displayed at step 453 may include, but are not limited to: apartment number and address, name of the installer, correct time and date and node's unique ID number. If the unit does not have a display the information is necessarily displayed by the smartphone. The installer verifies that the information displayed is correct.
4. A finalization of the linking occurs at step 454 and generally includes a final confirmation entry by the installer and final confirmation output from the smartphone. LAP Output: "To complete the linking sequence, please press the acknowledge button on the unit for [X] number of seconds." "X" may be any appropriate finite number, such as five. Installer performs the requested task and this completes the linking process on this mesh node. LAP Output: "This completes the linking sequence. Good job, thanks." The linking is completed when the coordinator informs the smartphone (and thereby the installer) that it indeed received the proper acknowledgment from the proper node.

As shown in FIG. 4C, process 400 may continue with routine 460 as follows:
1. At step 461, determination is made as to whether the installer has the necessary access to the physical installation location. LAP Output: "Please acknowledge that you have access to the apartment and that you will proceed to install the mesh node hardware." If the installer acknowledges having access to the location, the linking proceeds. LAP Output: "Please proceed with the installation."
2. If the installer cannot get access to the installation location, then the installation is aborted at step 462 and the sequence has to be started again from the beginning as in a new installation.
3. LAP Output: "Please specify how many zones in this installation." Installer enters the total number of zones at step 463. This may be 2 zones or more than 2 zones, each zone requiring an individual node but having the same address. For illustration purposes, this example will assume the installer enters "2".
4. LAP Output: "Please name the zones." Installer enters the names for each of the plurality of zones at step 464. For this example, these may be as follows:
Zone 1: "Living Room"
Zone 2: "Master Bedroom"
5. LAP Output: "Once the installation is completed in Zone [1—Living Room] and the Unit has power, verify that the information displayed on the screen is correct." Here, the display screen of reference may be a screen on the mesh node (i.e. "Unit") if it has one and/or a human interface of the smartphone. The summary details displayed at step 465 may include, but are not limited to: apartment number and address, name of the installer, correct time and date and node's unique ID number. If the unit does not have a display the information is necessarily displayed by the smartphone. The installer verifies that the information displayed is correct.

6. A finalization of the linking occurs at step 466 and generally includes a final confirmation entry by the installer and final confirmation output for the installer. LAP Output: "To complete the linking sequence, please press the acknowledge button on the unit for [X] number of seconds." "X" may be any appropriate finite number, such as five. Installer performs the requested task and this completes the linking process on this zone. LAP Output: this "This completes the linking sequence for Zone [1]. Good job, thanks." The linking for the zone is completed when the coordinator informs the smartphone that it indeed received the proper acknowledgment from the proper mesh node.

7. Steps 465 and 466 must be repeated for each of the zones until all zones are successfully linked. A check is made after linking each zone (with the optional exception of the first zone, since it has already been determined there is more than one zone) at step 467. If any zones remain which are not linked, steps 465 and 466 repeat for the next unlinked zone. The LAP may provide one or more transitions as the user completes one zone and before beginning another. LAP Output: "This completes the linking sequence for Zone [1, Living Room]. Now proceed to Zone [2, Master Bedroom]."

8. After a determination is made at step 467 that all zones have been linked, an ultimate finalization of the linking for the location may occur at step 468 and generally includes a final confirmation output for the installer. LAP Output: "This completes the linking sequence for this location. Good job, thanks." The linking for the location (including all zones for that location) is completed when the coordinator informs the smartphone that it indeed received the proper acknowledgment from the proper mesh node for each of all the zones for that mesh node.

Certain modifications or additions to process 400 may be applied in accordance with the invention. For example, the process 400 may provide an option to abort the linking operation at any step.

For some embodiments, some process steps may be assisted or supplemented by human intervention and action. For example, the central office computer may receive input from a human operator giving confirmation to authorize or deny a linking upon a preliminary determination made by the verification module.

FIG. 5 shows a mesh network system 500 without a central office computer (COC). In this system 500, the coordinator 506 comprises verification module 502 and assumes the functions and steps otherwise provided by a COC such as COC 307 of system 300 (FIG. 3). The coordinator 506 may communicate with the mobile electronic device 501 via connection 508 and with the one or more mesh nodes 505 by connection 510. Connection 508 may be, for example, a direct IP or Wi-Fi link. Alternatively or additionally, the coordinator 506 may communicate with mobile electronic device 501 via an interface module 504 and as shown by arrows 504a and 504b.

With the exception of the coordinator 506 performing any operations which might otherwise be performed by a COC, system 500 generally operates in the same manner as system 300 of FIG. 3 and exemplified in process 400 of FIG. 4. Linking information may be kept in just the coordinator 506 or, alternatively, both the coordinator 506 and the mobile electronic device 501. It is advantageous that if at a later time a COC is supplied, such linking information (e.g. collection of location and node ID pairings) is downloaded to the COC and removed from the mobile electronic device 501 in the circumstance it was stored therein. Particularly in the absence of a COC, it is preferred that the linking information be backed up to at least one non-volatile storage medium (not shown) at a secure remote location so that malfunction of disappearance of the coordinator 506, such as through theft or accident, would not result of loss of this vital data.

Figure 6:
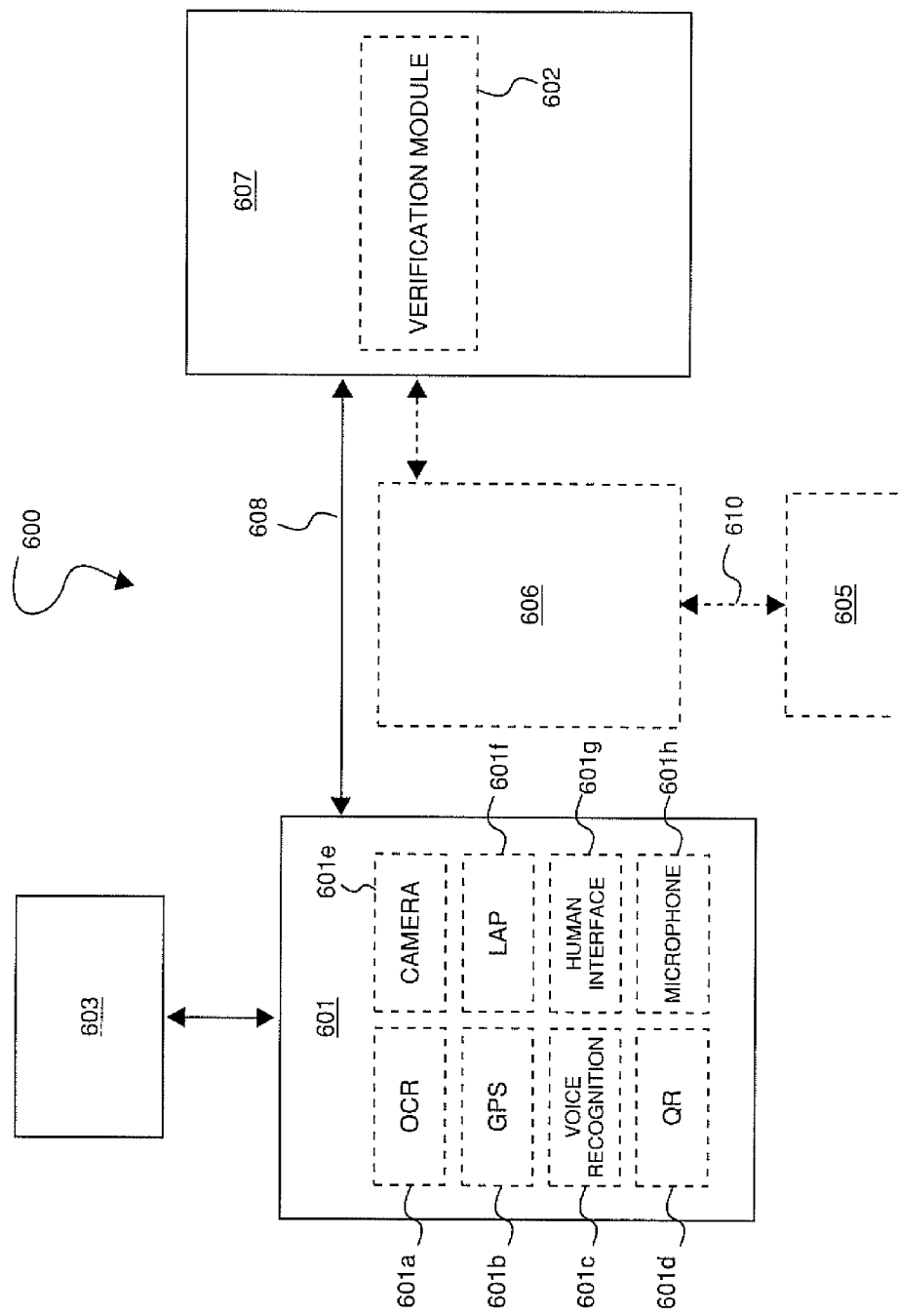
FIG. 6 shows a mesh network system without a coordinator.

FIG. 6 shows a mesh network system 600 without a coordinator or, alternatively, one in which the coordinator has been disabled. In this system 600, a central office computer (COC) 607 comprises verification module 602 and performs most or all functions and steps which are otherwise provided by a coordinator such as coordinator 306 of system 300 (FIG. 3). With the exception of the COC 607 performing operations which might otherwise be performed by a coordinator, system 600 generally operates in the same manner as system 300 of FIG. 3 and exemplified in process 400 of FIG. 4 up until the point in the sequence that the linking process is turned over to a coordinator. In system 600, the COC 607 will continue to manage the process and perform the linking although it will not be able to communicate directly with the one or more mesh nodes 605. If a mesh node 605 has a display then appropriate information could be displayed thereon for the installer 603 in addition to the display of such information on the mobile electronic device 601. This provides redundancy for cross-checking to insure proper operation of the mesh node 605. For a system 600, a coordinator 606 would eventually be supplied and linking information transferred to the coordinator 606. Coordinator 606 would, in turn, communicate directly with the one or more mesh nodes 605 by connection 610.

In some embodiments, a coordinator may be substituted by one of a plurality of mesh nodes of the same mesh network. Generally, coordinator functions and steps are performed by a computer for a particular building or campus. However, it is also possible that in a comparatively small system having a limited number of mesh nodes (e.g. ten or fewer) all coordinator functions may be assigned to and performed by a particular designated mesh node configured and programmed to perform such steps.

While various embodiments have been described above, it should be understood that they have been presented only as illustrations and examples of the invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents.

Having thus described my invention, what I claim as new and desire to secure by Letters Patent is:

1. A method of linking at least one mesh node in a mesh network, comprising the steps of:

receiving, by a mobile electronic device input data including an installation address and a mesh node identification, said mobile electronic device having an installed Linking Application Program (LAP) which prompts an installer to input said installation address and said mesh node identification;

verifying said input data received with said mobile electronic device with verification criteria using a verification module communicating with said mobile electronic device under the control of the LAP, said verification criteria including an agreement, wherein said installation address and a reference installation address are in agreement; and authorizing said linking with said verification module if said verification criteria are met in said verifying step or denying said linking with said verification module if said verification criteria are not met in said verifying step.

2. The method of claim 1, wherein said receiving step further includes receiving with said input data GPS coordinates of said mobile electronic device and wherein said agreement of said verifying step includes agreement of said installation address, said reference installation address, and said GPS coordinates.

3. The method of claim 1, wherein said receiving step further includes receiving with said input data one or more photographs and wherein said agreement of said verifying step includes agreement of said installation address, said reference installation address, and an address in said one or more photographs.

4. The method of claim 1, wherein said mobile electronic device comprises said verification module.

5. The method of claim 1, further comprising the step of transmitting said input data from said mobile electronic device at a first location to a coordinator at a second location, said coordinator comprising said verification module.

6. The method of claim 1, further comprising a step of transmitting said input data from said mobile electronic device at a first location to a central office computer at a second location, said central office computer comprising said verification module.

7. The method of claim 1, wherein said receiving step further includes receiving an installer identification as input data, and said verification criteria of said verifying step further includes a second agreement, wherein said installer identification and a reference installer identification are in agreement.

8. The method of claim 1, further comprising the step of requesting with said verification module from said mobile electronic device one or more additional or corrected input data if any one criterion of said verification criteria is not fulfilled.

9. The method of claim 1, wherein in said receiving step, said mobile electronic device receives said mesh node identification as a Quick Response (QR) code.

10. The method of claim 1, wherein said address in said one or more photographs is determined by said mobile electronic device using optical character recognition.

11. The method of claim 1, wherein said step of receiving includes recording with said mobile electronic device one or more of said input data as an audio recording.

12. The method of claim 11, wherein said step of receiving includes recording with said mobile electronic device audio data communicating one or more of said installation address, said mesh node identification, and an installer identification.

13. The method of claim 1, wherein said steps of receiving, verifying, and authorizing are repeated for each node of a plurality of mesh nodes.

14. The method of claim 1, wherein said verification criteria of said verifying step further include a second agreement, wherein said mesh node identification and a reference mesh node identification are in agreement.

15. A linking system for linking a mesh node in a mesh network, comprising:

at least one mesh node having a mesh node identification;

a mobile electronic device which includes a user interface, said mobile electronic device running a Linking Application Program (LAP) which prompts an installer to enter an address of a location where said at least one mesh node is to be installed and an identification of said at least one mesh node, the mobile electronic device being configured to receive input data from the installer including the installation address and said mesh node identification; and a verification module communicating with the mobile electronic device, said verification module having a processor and a non-volatile storage medium comprising instructions which, when executed by said processor, cause said processor to perform the steps comprising of:

verifying said input data with verification criteria, said verification criteria including an agreement, wherein said installation address and a stored reference installation address are in agreement;

authorizing said linking of said at least one mesh node if said verification criteria are met in said verifying step; and denying said linking of said at least one mesh node if said verification criteria are not met in said verifying step.

16. The linking system of claim 15, wherein said mobile electronic device further includes a GPS module and is configured to receive with said input data GPS coordinates from said GPS module, and wherein said verification module comprises further instructions which, when executed by said processor, cause said processor to verify an agreement of said installation address, said reference installation address, and said GPS coordinates in said verifying step.

17. The linking system of claim 15, wherein said mobile electronic device further includes a camera and is configured to receive with said input data one or more photographs captured with said camera, and wherein said verification module comprises further instructions which, when executed by said processor, cause said processor to verify an agreement of said installation address, said reference installation address, and an address in said one or more photographs in said verifying step.

18. The linking system of claim 15, wherein said mobile electronic device comprises said verification module.

19. The linking system of claim 15, further comprising a coordinator configured to communicate with said mobile electronic device, said communicator comprising said verification module and said input data being transmitted from said mobile electronic device at a first location to said coordinator at a second location.

20. The linking system of claim 15, further comprising a central office computer (COC) configured to communicate with said mobile electronic device, said COC comprising said verification module and said input data being transmitted from said mobile electronic device at a first location to said COC at a second location.

21. The linking system of claim 15, wherein said mobile electronic device is further configured to receive an installer identification as input data and said verification module comprises further instructions which, when executed by said processor, cause said processor to additionally include as a verification criterion of said verifying step a second agreement, wherein said installer identification and a reference installer identification are in agreement.

22. The linking system of claim 15, wherein said verification module comprises further instructions which, when executed by said processor, cause said processor to additionally perform a step of requesting from said mobile electronic device one or more additional or corrected input data if any one criterion of said verification criteria is not fulfilled.

23. The linking system of claim 15, wherein said mobile electronic device is a smartphone or tablet.

24. The linking system of claim 15, wherein said verification criteria include a second agreement, wherein said mesh node identification and a stored reference mesh node identification are in agreement.

\* \* \* \* \*